United States Patent [19]

Ojima

[11] Patent Number: 4,995,854
[45] Date of Patent: Feb. 26, 1991

[54] TENSIONER FOR A CHAIN, BELT OR THE LIKE

[75] Inventor: Juji Ojima, Aikawa, Japan

[73] Assignee: NHK Spring Co., Ltd., Yokohama, Japan

[21] Appl. No.: 442,147

[22] Filed: Nov. 28, 1989

[30] Foreign Application Priority Data

Dec. 7, 1988 [JP] Japan .................................. 63-309617

[51] Int. Cl.⁵ ............................................. F16H 7/08
[52] U.S. Cl. ..................................... 474/111; 474/138
[58] Field of Search ...................... 474/101, 109–111, 474/113–117, 133, 135, 136, 138

[56] References Cited

U.S. PATENT DOCUMENTS

| | | | |
|---|---|---|---|
| 4,702,726 | 10/1987 | Ojima et al. | 474/138 X |
| 4,722,720 | 2/1988 | Ojima et al. | 474/138 X |
| 4,902,266 | 2/1990 | Ojima et al. | 474/111 |

Primary Examiner—Thuy M. Bui
Attorney, Agent, or Firm—Fleit, Jacobson, Cohn, Price, Holman & Stern

[57] ABSTRACT

In a tensioner in which a male screw member and a female screw member are mounted in a casing of the tensioner in a screwed state and the female screw member advances in an axial direction by the rotation of the male screw member with the spring force, a cap is attached at the top end of the female screw member and further an oil sump storaging a lubricant oil is formed in an axial direction of the cap.

9 Claims, 2 Drawing Sheets

TENSIONER FOR A CHAIN, BELT OR THE LIKE

BACKGROUND OF THE INVENTION

This invention relates to a tensioner to provide a fixed tension to stress a chain or a timing belt which drives a cam shaft of an engine of a vehicle and the like.

In general, a tensioner is used as a chain tensioner or a belt tensioner to an engine. The tensioner operates to press the belt or the chain in a certain direction directly or indirectly so as to maintain a fixed tension when the chain or the belt occurs a slackness due to the extension and the friction thereof.

FIG. 4 shows a conventional example of such tensioner. As illustrated in Figure, a male screw member 2 is screwed with a female screw member 3 to be inserted within a casing 1. The male screw member 2 is screwed with the female screw member 3 at the former half portion of the male screw member 3 and a coil spring 4 is outwardly inserted through the latter half portion 4a of this coil spring 4 is inserted into a long groove 1a formed within the casing 1, another end portion 4b being inserted into a slit of the male screw member 2 thereby providing a rotation force to the male screw member 2. On the other hand, the female screw portion 3 penetrates a bearing 5 mounted to an open end (left end) of the casing, said top end (left end) being covered with a cap 6.

A hole of the bearing 5 through which the female screw member 3 penetrates, is formed to be a non-circular type such as a small oval type wherein an opposite faces are cut in parallel and the outer form of the female screw member 3 is also formed the same type. In such a construction the female screw member 3 is restrained the rotation thereof by the bearing 5, the rotation force from the male screw member 2 being changed to a propelling force of the female screw member 3 thereby the female screw member 3 advances in an escaping direction (left direction) from the casing 1. Accordingly, the cap 6 at the top end of the female screw member 3 always urges the chain or the belt whereby a fixed tension is allowed to be maintained. In FIG., the numeral 7 is an elastic boot which covers the open end of the casing 1, and 8 is a seal bolt screwed with the base end (right side) of the casing 1. Such tensioner includes a lubricant oil therein. These boot 7 and seal bolt 8 are attached in order to prevent the invasion of dusts into the casing 1 from the inside and the outside of the engine and the leakage of the lubricant oil within the casing 1 to the outward.

The above lubricant oil is necessary to secure a smooth operation of the tensioner.

However, in such a construction an inner volume of the casing 1 is not fixed, but changes according to the advancing or retreating of the female member 30. Accordingly, it is desirable to be able to secure a sufficient supply of the lubricant oil even if the above inner volume is changed. Such request is particularly important to a tensioner having a triple construction wherein a dimension of the whole device is shortened by combining three members of the male screw member, female screw member and the coil spring so as to pile them in a diameter direction because the volume of a cave in the casing thereof becomes smaller.

The tensioner having the above triple construction is developed in view of that the traditional tensioner described above necessitates to have a former half portion wherein the male screw portion 2 is screwed with the female screw portion 3, and a latter half portion wherein the coil spring 4 is outwardly inserted therethrough and that the whole device becomes long in an axial direction since the dimension of this male screw member decides the dimension of the device.

Therefore, in a traditional tensioner (FIG. 4), a bored holed is provided from the top end surface to the axial direction at the former half portion of the male screw member 2 to use the bored hole as an oil sump in order to supply a short amount of the lubricant oil due to the increase of the inner volume of the casing 1.

However, there is a problem that the formation of the bored hole at the above portion occurs a heat strain whereby the preparation of a male screw member 2 having a high accuracy is impossible because the former half portion of the male screw member 2 is a screwed portion with the female screw portion, said portion being subjected to the heat treatment during the preparing step.

In such a conventional tensioner, to secure a sufficient lubricant oil has been a subject of a long period of time.

BRIEF DESCRIPTION OF THE INVENTION

The object of this invention is to provide a tensioner which can be easily manufactured and is provided with an oil therein.

In order to attain the above object, this invention is constructed so that a male screw member and a female screw member may be provided within a casing in a screwed state and when the male screw member is rotated by a spring force, the female screw member may advance in an axial direction by this rotation. Further, this invention is characterized in that a cap is secured to the top end of the female screw member, said cap being adapted to form an oil sump of the lubricant oil in an axial direction thereof.

In this constitution, when the inner volume increase due to the advancement of the female screw, the lubricant oil is supplied from the oil sump of the cap.

DETAILED DESCRIPTION OF THE INVENTION

The embodiment of this invention is hereinafter described with reference to the attached drawings.

Figure 1:
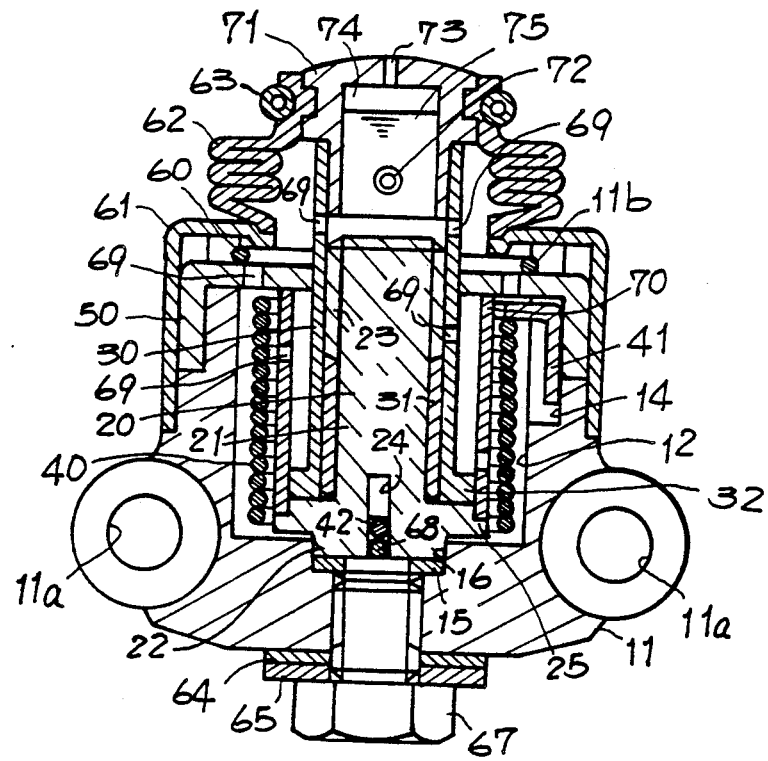
FIG. 1 and FIG. 2 are a cross sectional view and an upper surface view of an example according to this invention respectively.
Figure 2:
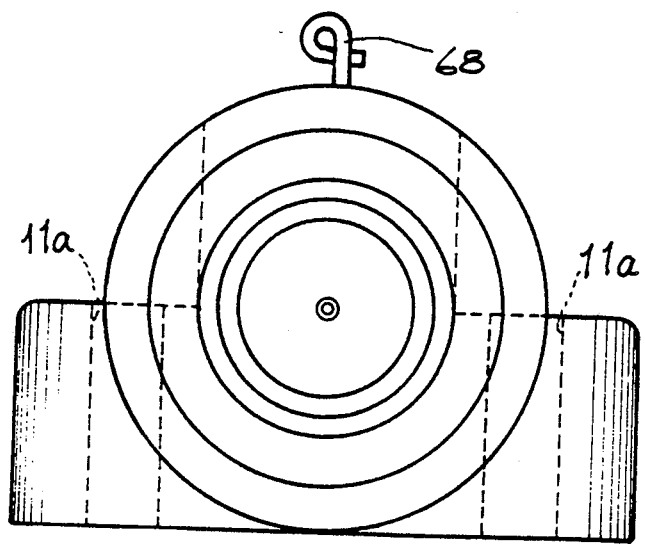

FIG. 1 is a cross sectional view of the example applied to a belt tensioner of this invention. FIG. 2 is an upper surface view thereof. A cave portion 12 in an axial direction is formed at a casing 11 wherein an attached hole 11a to an engine or the like is formed at an outer side thereof. A male screw member 20, female screw member 30 and coil spring 40 are assembled within this cave portion 12. An axial portion 21 of the top end side (top end side) in the male screw member 20 is screwed with the female screw member 30, a fixed portion 22 of the base portion side (lower side) thereof being inserted to a concave portion 16 formed at the base side portion of the cave 12 together with a washer 15 to be supported rotatively.

In this case, the axial portion 21 of the male screw member is provided with a screw portion 23 through a whole outer circumference. On the other hand, the female screw member 30 is provided with a screw portion 31 which screws with the male screw portion 23 at a portion of the inner circumferential surface. Further, a bearing member 50 is attached to the top end portion (upper end portion) of the casing 11. The bearing member 50 is provided with a bearing hole at a central portion thereof and the extended portion from the bearing hole toward outside is inserted into an inserted groove formed at a fixed distance at the top end portion of the casing 11 by being bent toward the outside. By this, the bearing member 50 is fixed to the casing 11 without rotation. Further, the bearing hole is bored on the bearing member so as to be a non-circular form such as approximately an oval form consists of a parallel line and arc lines which connect both ends of the parallel line. The female screw member 30 is inserted into this bearing hole so as to slide in a restrained state of the rotation. For this purpose, the outer form of the female screw member 30 is cut in parallel so that its form may correspond to the bearing hole of the bearing member 50 whereby a stroke length of the female member 30 can be secured sufficiently because approximately a whole of the female screw member 30 is can be inserted through the bearing hole. At the base end portion of the female screw member 30 is formed a stopper flange 32 against the bearing member 50 stops the advancement of the female screw member 30 thereby being able to perform the drawing out of the female screw member 30.

The coil portion of the coil spring 40 is outwardly inserted through the female screw member 30 and one end thereof 41 is bent in the axial direction of the casing 11 thereby being inserted into the long groove 14 formed at the cave portion 12 of the casing 11. On the other hand, another end 42 of the coil spring is inserted into a slit 24 formed at the fixed portion 22 of the male screw portion 20. By this, the male screw member 20 is rotated by the coil spring 40 whereby the female screw member 30 is adapted to drive and advance straightly. In such a construction wherein the male screw member 20 and the female screw member 30 are inserted into coil spring 40, the length of the device in axial direction, or the length in the controlling direction of the tension is shortened thereby being able to make the device smaller.

In addition to the above construction, a cap 71 is inserted at the top end portion of the female screw member 30, the top end surface thereof being adapted to abut against the belt directly or indirectly. In this case, attaching of the cap 71 is performed by forcibly inserting a spring pin 72 to the female screw member 30 and the cap 71 to prevent the drawing out after the insertion of the cap 71 to the top end portion of the female screw member 30. Further at the cap 71, the top end portion of a boot 62 having a elasticity is attached thereto by the insertion of a garter spring 63, the base end portion of the boot 62 being adhered to a cover 61 inserted into the top end portion of the casing 11 whereby the top end portion of the casing 11 is covered to shelter from the outside. The cap 71 is provided with a hole 74 opened in the direction of the female screw member 30 in the axial direction thereof. This hole is used as an oil sump 74 wherein the lubricant oil 75 is stocked therein. In other words, the lubricant oil 75 stocked in the oil sump 74 is, when the inner volume of the oil sump is increased, supplied into the casing 11 from the female screw mwmber 30 according to the increase thereof whereby the lubrication due to the lubrication oil can be performed sufficiently.

In order to secure the lubrication of the lubrication oil, holes 69 are formed at the bearing member 50 and a collar 70 described herein after suitably. In this example, the cap 71 is used so as to be upward, said cap 71 being provided with an air-drawing hole 73 connected to the outside whereby a smooth lubrication of the lubrication oil can be performed according to the change of each inner volume of the boot 62 and the casing 11.

In this example, the advancing stroke of the female screw member 30 can be sufficiently secured in spite of being possible to make a whole body smaller and the lubricant oil 75 in the cap 71 can be lubricated sufficiently according to the increase of the inner volume due to the advancement of the female screw member 30.

Further, in this example, a cylindrical collar 70 is inserted between the female screw member 30 and the coil spring 40. Although this collar 70 is not always necessary because this collar has no relation with the substantial function as a tensioner, the contact with and cutting into the female screw member 30 due to the bending of the coil portion of the coil spring 40 are prevented by the equipment of the collar whereby the slide of the female screw member 30 becomes more smooth. The base portion of such collar 70 is inserted into a step portion 25 formed at the outer periphery of the fixed portion 22 of the male screw member 20 thereby being supported. The numeral 60 is a snap ring engaged to a top end surface of the casing 11, said snap ring preventing the bearing member 50 from coming off.

Further, a seal bolt 67 is screwed with the base portion side of the casing 11 through a seal sheet 64 and a washer 65 whereby the base side is closely sealed. Furthermore, the numeral 68 is a stopper pin which is inserted into the casing 11 from outside so that it may be inserted or extracted, said top end being adapted to reach within the slit 24 of the male screw member 20.

By this, the rotation of the male screw member 20 is locked in a state wherein the stopper pin 68 is inserted therein. In a assembly of this example described above, the collar 70 engaged with the male screw member 20 screwed with the female screw member 30, is inserted into coil spring 40 being latched to the slit 24 of the male screw member 20. On the other hand, a cap member 71 is equipped at the top end of the female screw member 30 and the bearing member 50 is inserted to the axial portion of the female screw member 30 whereby a subassy is formed. The subassy is inserted into the casing 11 and then the fixed portion 22 of the male screw member 20 is inserted into the casing 11 together with washer 15 to releasably support whereby the drawing out of the subassy is stopped by the snap ring 60. The snap ring 60 is engaged to a groove 11b formed at the top end of the casing 11. After securing the cover 60 to which one end of the boot 62 is fixed to the top end of the casing 11 by caulking or adhering, another end of the boot 62 is secured to the cap member 71 with a garter spring 63 to seal the top end portion of the casing. After this, a tool such as a driver or the like is inserted into the slit 24 of the male screw member 20 from the base side of the casing 11 to accumulate the energy by winding up the coil spring 40 due to the rotation of the male screw member 20. In this state, the rotation is locked by the insertion of the stopper pin 68. Further, after filling the space in the casing 11 with lubricant oil 75 by pouring the lubricant oil 75 and storaging the lubricant oil 75 in the oil sump 74 of the cap 71 the casing 11 is closely sealed with a seal bolt 67. By this, the assembling of the device is completed and the device is fixed, to the engine or the like.

When the stopper pin 68 is drawn out, the male screw member 20 is allowed to rotate by the coil spring 40, which advances the female screw member 30 to urge the belt.

Figure 3:
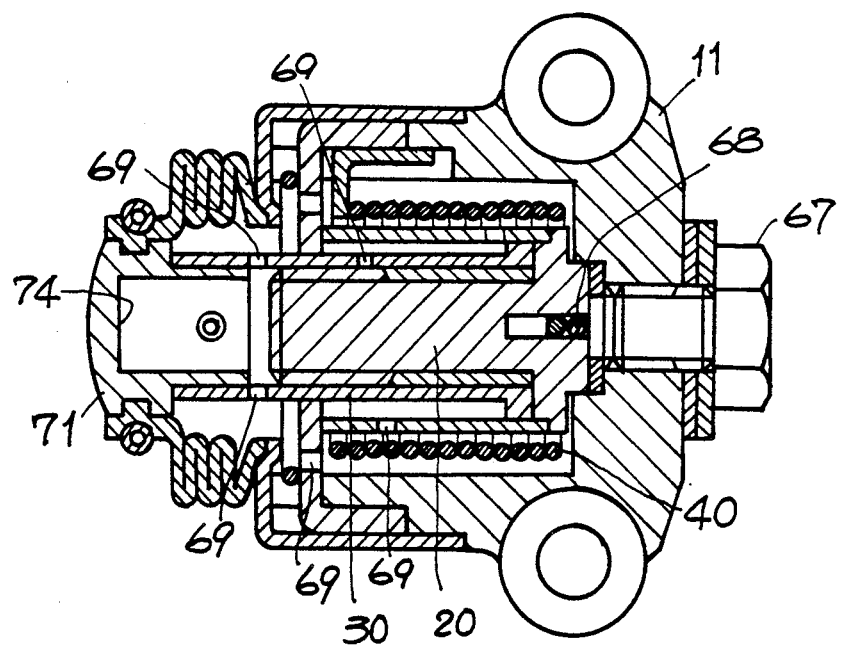
FIG. 3 is a cross sectional view of another example and FIG. 4 is a cross sectional view of a traditional device.
Figure 4:
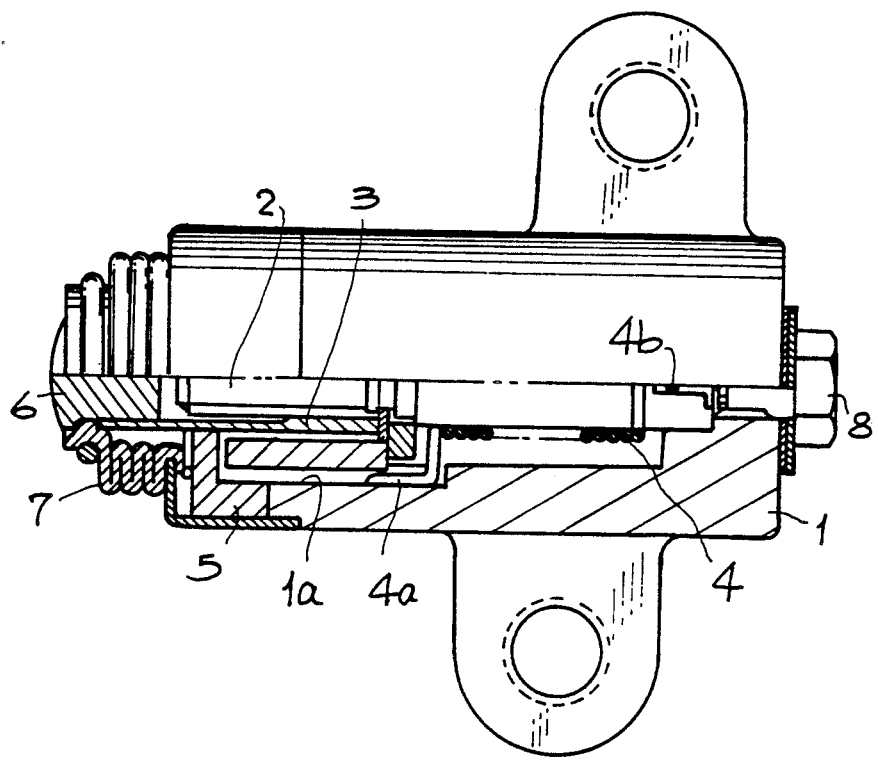

FIG. 3 is a cross sectional view which shows another example with the same numerals. In this example an air-escaping hole is not formed in the cap 71, the top end thereof being closed. In the tensioner of this example, the cap 71 is used by being positioned transversely, inclindly or downwardly, the top end portion of the cap 71 being closed to prevent the leakage of the lubricant oil. Accordingly, in this example it is necessary to secure on air-escaping hole, but a special working for air-escaping hole is not necessary by using an inserting hole which penetrates the stopper pin 68 as the air-escaping hole.

Further, an air-escaping hole may be formed at a suitable portion of the casing 11. Furthermore, it may be formed a potential hole in an axial direction of the seal bolt 67 as an air-escaping hole. In the example, since a sufficient lubricant oil can be storaged in the oil sump 74 formed in the cap 71, a smooth lubricant operation can be secured. Further, this invention is not only applied to the tensioner having triple construction described above, but also possible to apply to the traditional tensioner having a series construction.

As described above, since in this invention the amount of oil is secured by forming the storage of the lubricant oil in the cap attached to the female screw member which operated advancingly, the lubricant operation by the lubricant oil can be performed even if the inner volume increases due to the advancing of the female screw member. By this, even in a tensioner having a triple construction wherein the male screw member, female screw member and coil spring are piled up, a sufficient amount of the lubricant oil can be secured whereby the extention of the life according to the increase of the lubricant effect and the minimization of the device can be attained.

Further since the oil sump is designed by boring the cap, the working of other member is maintained its accuracy as it is, thereby being able to manufacture a good tensioner easily.

Furthermore, since the cave portion to be an oil sump is provided in the cap, it is possible to make the device lighter so much.

What I claim is:

1. A tensioner for a chain, belt or other endless drive member wherein a male screw member and a female screw member are provided within a casing in a screwed state, the male screw member is rotated by a spring force to advance the female screw member in an axial direction, a cap is secured to the top end of the female screw member and said cap has an internal cavity defining an oil sump for storing lubricant oil therein said cavity having a diameter substantially conforming to an inner thread diameter of the male screw number.

2. A tensioner according to claim 1 wherein a spring which rotates the male screw member is a coil spring, and the male screw member, female screw member and coil spring are assembled so as to be a triple construction in the axial direction by outwardly inserting the female screw member and the coil spring in order with a center of the male screw member.

3. A tensioner according to claim 1 wherein an air escape hole is formed at the top end of the cap.

4. A tensioner according to claim 1 wherein an inserting hole of a stopper pin which restrains the rotation of the male screw member is bored, said inserting hole from which the stopper pin is drawn out being used as an air escape hole so that it may be positioned at an upper portion of the lubricant oil.

5. A tensioner according to claim 1 wherein the cap has a closed end and an air escape hole is formed at a seal bolt which seals a base end portion of the casing.

6. A tensioner according to claim 1 wherein an air escape hole is formed at a seal bolt which seals a base end portion of the casing.

7. A tensioner for a chain, belt or other endless drive element wherein a male screw member and a female screw member are provided within a casing in a screwed state, the male screw member is rotated by a spring force to advance the female screw member in an axial direction, a cap with a closed end is secured to the top end of the female screw member, and said cap has an internal cavity defining an oil sump for storing lubricant oil therein.

8. A tensioner according to claim 7 wherein a spring which rotates the male screw member is a coil spring, and the male screw member, female screw member and coil spring are assembled so as to be a triple construction in the axial direction by outwardly inserting the female screw member and the coil spring in order with a center of the male screw member.

9. A tensioner according to claim 7 wherein an inserting hole of a stopper pin which restrains the rotation of the male screw member is bored, said inserting hole from which the stopper pin is drawn out being used as an air escape hole so that it may be positioned at an upper portion of the lubricant oil.

* * * * *